Dec. 22, 1953
A. W. FRANCIS ET AL
2,663,670
SOLVENT EXTRACTION
Filed Dec. 4, 1951
4 Sheets-Sheet 1
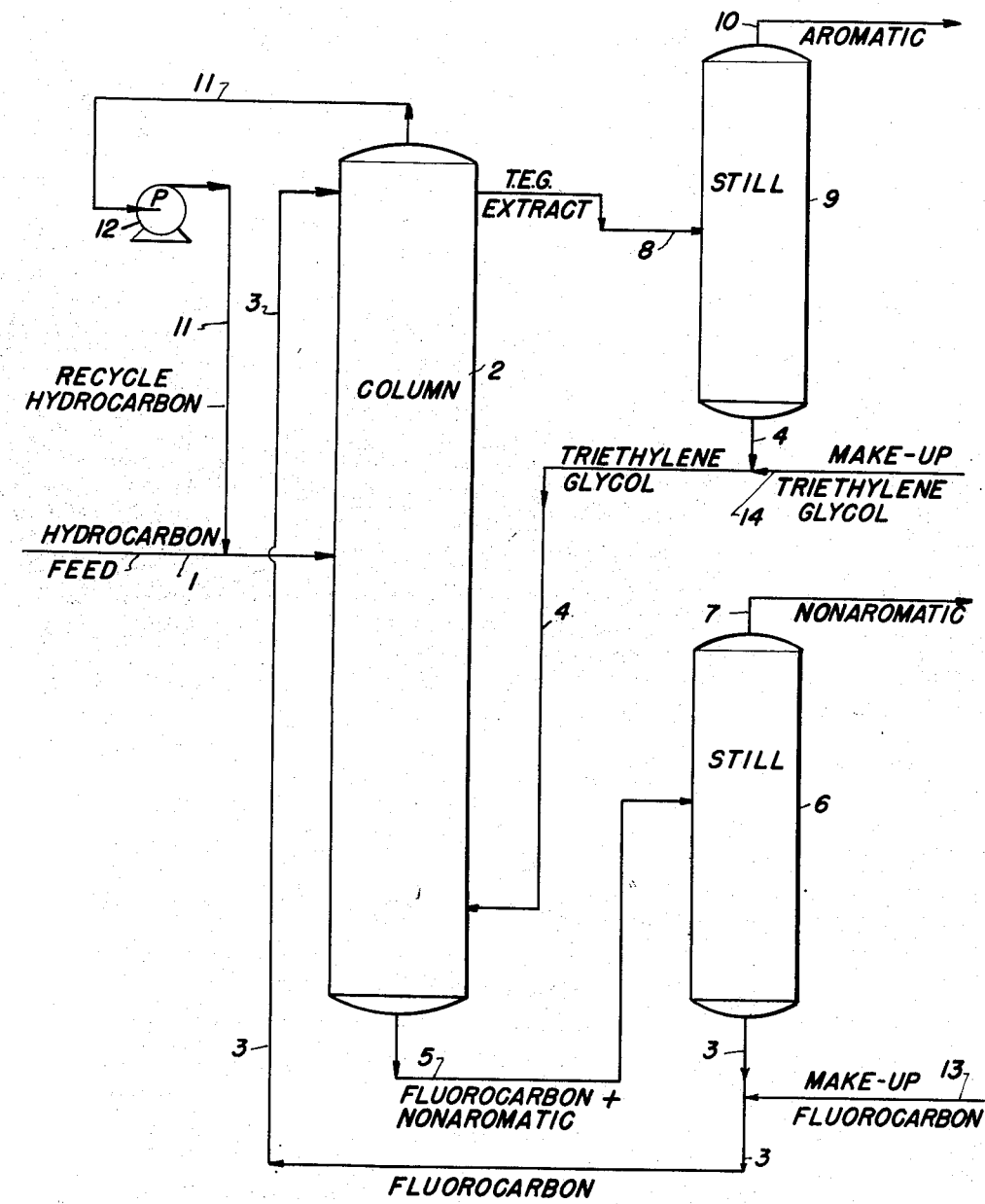
FIG. I
INVENTORS
ALFRED W. FRANCIS
BY GEORGE C. JOHNSON
AGENT Dec. 22, 1953 — A. W. FRANCIS ET AL — 2,663,670
SOLVENT EXTRACTION
Filed Dec. 4, 1951 — 4 Sheets-Sheet 2
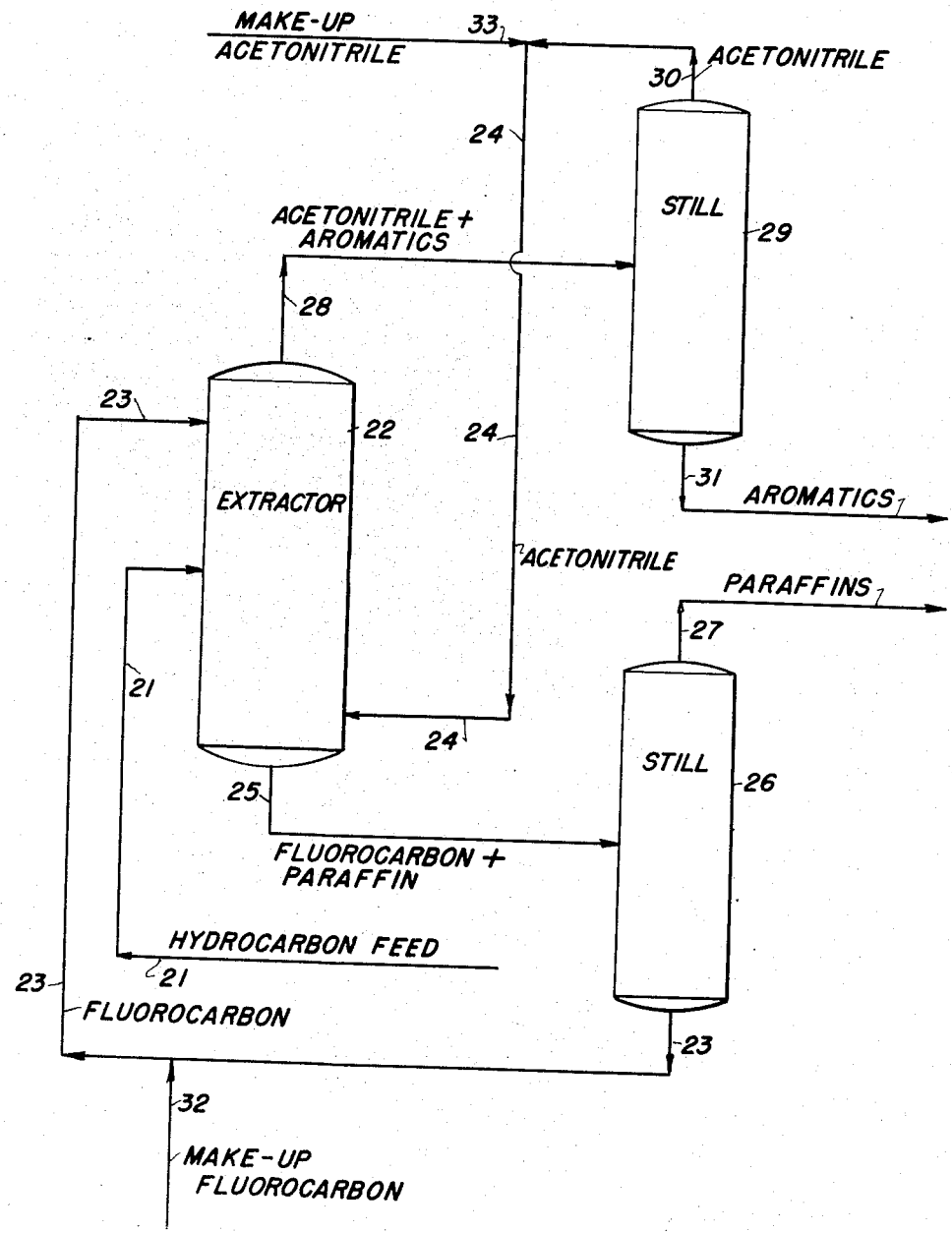
FIG. II
INVENTORS
ALFRED W. FRANCIS
GEORGE C. JOHNSON
BY
Robert D. Flynn
AGENT

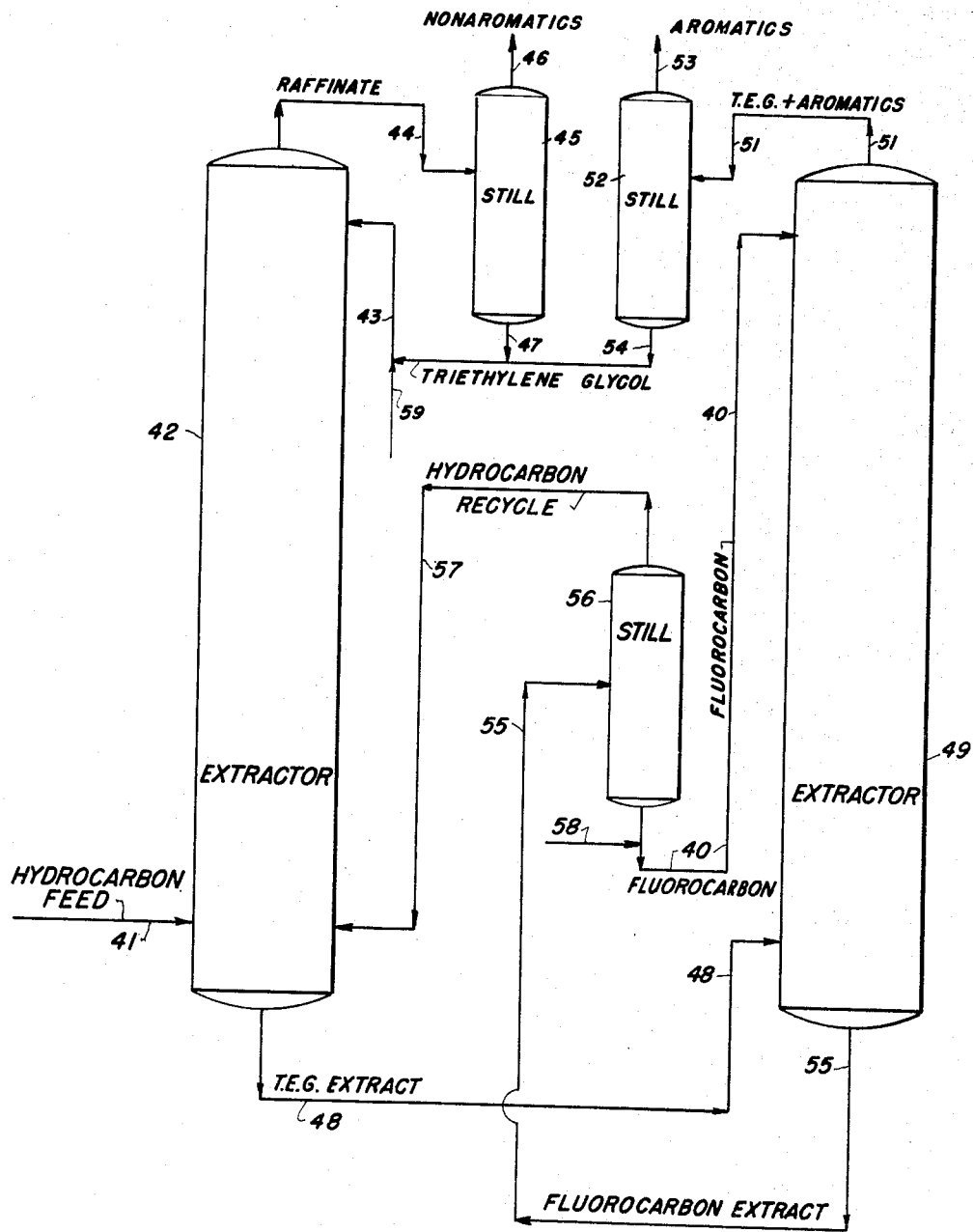
FIG. III

Dec. 22, 1953  A. W. FRANCIS ET AL  2,663,670
SOLVENT EXTRACTION
Filed Dec. 4, 1951
4 Sheets-Sheet 4
FIG. IV A
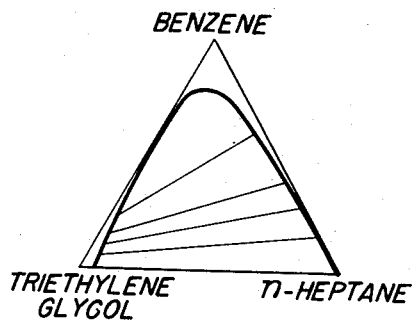
FIG. IV B
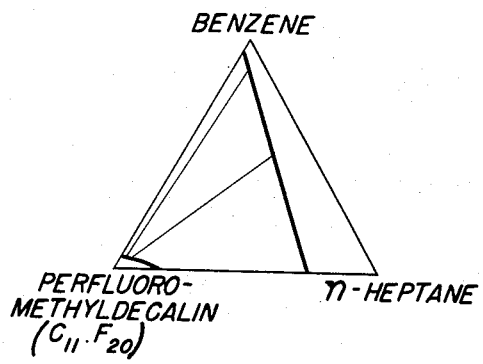
FIG. V
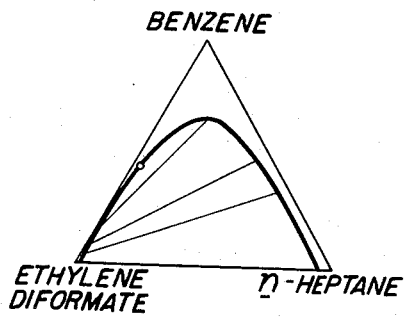
FIG. VI
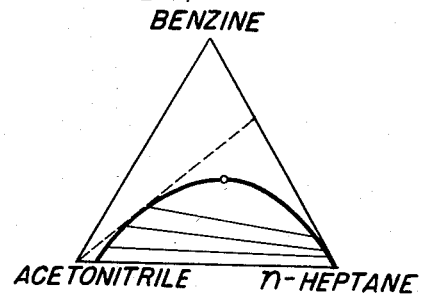
FIG. VII
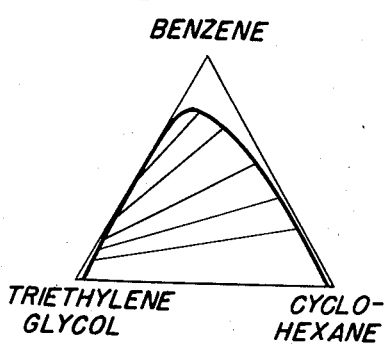
FIG. VIII
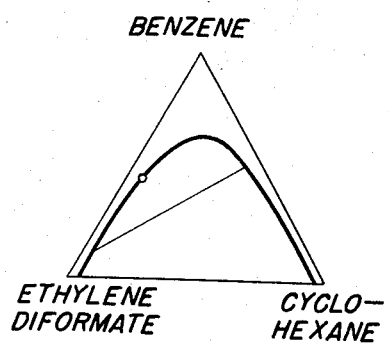
INVENTORS
ALFRED W. FRANCIS
BY GEORGE C. JOHNSON
Robert D. Flynn
AGENT Patented Dec. 22, 1953

2,663,670

UNITED STATES PATENT OFFICE 2,663,670

SOLVENT EXTRACTION

Alfred W. Francis and George C. Johnson, Woodbury, N. J., assignors to Socony-Vacuum Oil Company, Incorporated, a corporation of New York Application December 4, 1951, Serial No. 259,746

12 Claims. (Cl. 196—14.2)

This invention has to do with extraction with certain selective solvents of various mixtures, and particularly of hydrocarbon mixtures, to separate the mixtures into fractions having different properties.

I. FIELD OF INVENTION

Numerous processes have been developed for the separation of hydrocarbons and hydrocarbon derivatives of different molecular configuration by taking advantage of their selective solubility in selected reagents or solvents from which they later can be separated. Exemplary of hydrocarbon separation procedures is the Edeleanu process, wherein paraffinic materials are separated from aromatics by virtue of the greater solubility of aromatics in liquid sulfur dioxide. Lubricating oil solvent refining processes, solvent deasphalting, solvent dewaxing and the like are further examples of the separation of hydrocarbons of different molecular configuration.

Many materials have been proposed and some of them have been used as selective solvents for effecting separation of different classes of hydrocarbons. They vary greatly in selectivity and in applicability for various boiling ranges of hydrocarbons. For the same boiling range the solubility increases in the order, paraffins, naphthenes, olefins, alkyl benzenes and polycyclic aromatics for practically all available solvents. For many extractions this is a convenient order, since small quantities of polycyclics which are detrimental to the viscosity index of a lubricant, can be removed by suitable solvents. For example, aromatics in hydrocarbon mixtures have been concentrated by treatment with aniline, phenol, many derivatives of aniline and phenol, acetonitrile, benzyl alcohol, dipropionitriles, furfural, furfuryl alcohol, methyl and ethyl sulfates, nitromethane, etc. At low temperatures, sulfur dioxide, chlorex, nitrobenzene, etc., have been used. Many of these, such as sulfur dioxide, are unsuitable for concentration of benzene except with "wash oil," because they are miscible with the hydrocarbons of boiling point similar to that of benzene. All of the aforementioned solvents dissolve aromatics in preference to non-aromatic hydrocarbons.

In some cases, a reverse selectivity is more convenient and advantageous. For example, such a selectivity—for non-aromatics in preference to aromatics—is advantageous for removing a small quantity of non-aromatics from an essentially aromatic fraction.

Fluorocarbons, which have only recently been given attention in the chemical art, and of which relatively little is known to date, have now been found to have a preferential selectivity for non-aromatics as opposed to aromatics.

This invention is predicated upon the discovery of advantageous and practical solvent extraction procedures in which a fluorocarbon is used alone or in combination with certain solvents with which it cooperates.

II. OUTLINE OF INVENTION

It has now been discovered that a plurality of fractions of different properties are obtained by contacting a mixture of aromatic and non-aromatic hydrocarbons, with a fluorocarbon (A) which is incompletely miscible with the hydrocarbon mixture, and with a second solvent (B) which has the following characterizing features:

(1) Incompletely miscible with the hydrocarbon mixture,
(2) Incompletely miscible with the fluorocarbon,
(3) Forms three phases with the hydrocarbon mixture and the fluorocarbon and (4) Has a preferential affinity for aromatic hydrocarbons, as opposed to non-aromatic hydrocarbons.

It has also been discovered that a hydrocarbon fraction having a high concentration of aromatics can be further concentrated by contacting the same with a fluorocarbon.

III. OBJECTS

It is an object of this invention, therefore, to provide an effective means for separating a multiplicity of fractions (or compounds) of different properties from mixtures containing the same.

It is also an object of this invention to provide for the selective separation of several hydrocarbon fractions of different properties from hydrocarbon mixtures. An important object is the selective separation of several hydrocarbon fractions, differing in properties, from hydrocarbon mixtures within the molecular weight range of about 75 to about 400. A further object is to selectively separate non-aromatics, paraffins and/or naphthenes, from mixtures containing the same. Still another object is to separate benzene and benzene hydrocarbons from mixtures containing the same. One other object is to provide more highly aromatic concentrates from hydrocarbon fractions having a relatively high concentration of aromatics.

IV. INVENTION IN DETAIL

Other objects and advantages of the invention will be apparent from the following description.

As indicated above in section II, this invention employs a fluorocarbon (A) alone or in combination with a second solvent with which it cooperates. The fluorocarbons contemplated herein are those which are liquid under extraction conditions, which have at least about four carbon atoms per molecule, and which have substantially all fluorine atoms associated with said carbon atoms. Instead of fluorocarbons, hydrocarbon derivatives in which at least about 80% of the hydrogen has been substituted by fluorine and fluorocarbons containing one or more other halogen atoms in the molecule can be used; typical of such compounds are $C_7HF_{15}$, $C_7ClF_{15}$ and $C_7HClF_{14}$.

Preferred for the purposes of this invention, however, are the fluorocarbons represented by the general formula $C_xF_y$ wherein $x$ represents the number of carbon atoms and is an integer from about four to about 20, and $y$ represents an integer from about 8 to about 40. The fluorocarbons can be of straight chain or of cyclic configuration. Illustrative of such fluorocarbons are: perfluorobutane ($C_4F_{10}$); perfluoropentane ($C_5F_{12}$); perfluorohexane ($C_6F_{14}$); perfluoroheptane ($C_7F_{16}$); perfluorodimethylcyclohexane ($C_8F_{16}$); perfluoromethyldecalin ($C_{11}F_{20}$). Methods of preparation of such compounds are now well established in the art, and no detailed discussion thereof is believed necessary. By way of illustration, however, typical methods are described in U. S. Letters Patent 2,462,345, 2,462,347, and 2,427,116; and a bibliography of fluorocarbons is given in Industrial and Engineering Chemistry, 39, 367 (1947).

Fluorocarbons found to be particularly advantageous herein are perfluorodimethylcyclohexane, perfluoromethyldecalin, and perfluorokerosene.

As indicated above, this invention employs with the aforementioned fluorocarbons (A) solvents (B) which are incompletely miscible with the fluorocarbons and with the mixture to be extracted, which form three phases with the fluorocarbons and mixture, and which have a preferential affinity for aromatic hydrocarbons. If the solvents are not normally liquid, they also should become so in contact with the fluorocarbons or should become so at somewhat higher temperatures in a temperature range practicable for extraction. Included among this class of solvents are the following: acetic anhydride, acetonitrile, aldol, aniline, anisidines, benzoic anhydride, benzyl alcohol, carbitol, chloroacetic acid, p-chloro aniline, β-chloroethanol (ethylene chlorohydrin), chloromaleic anhydride, p-chlorophenol, α-chloropropionic acid, cinnamic aldehyde, cinnamyl alcohol, 2,4-dinitrochlorobenzene, diethylene glycol, dipropylene glycol, diethylene glycol monomethyl ether, β,β'iminodipropionitrile, β,β'oxydipropionitrile, β,β'thiodipropionitrile, ethylene diamine, ethylene diformate, ethyl sulfate, ethyl tartrate, furfural, formanilide, furfuryl alcohol, β-hydroxyethylacetate, β-hydroxypropionitrile, lactic acid, maleic anhydride, methanol, β-methoxyethanol, methyl furoate, methyl phthalate, methyl sulfate, monoacetin, o-nitroanisole, nitrobenzene, nitromethane, phenetidines, phenol, phenylethanolamine, phenyl phthalate, piperonal, liquid sulfur dioxide, tetrahydrofurfuryl alcohol, triethylene glycol and succinonitrile. All of these have been tested and found to be operative. To be practicable, a solvent should have a limited miscibility with the non-aromatic hydrocarbons, and should also have an appreciable solvent power for the aromatic hydrocarbons. This should be at least about two per cent at a practicable operating temperature. Particularly preferred herein are triethylene glycol and diethylene glycol.

The foregoing solvents and the aforementioned fluorocarbons are effective in resolving various mixtures into a multiplicity of fractions, or compounds, of different properties. They are particularly advantageous in the resolution of aliphatic hydrocarbon-alkylbenzene mixtures, naphthene - alkylbenzene mixtures, gasolines, fractions from hydrogenated coal, etc.

With regard to hydrocarbon mixtures suitable for extraction herein, it is recommended that mixtures boiling below about 150° C., or having an average molecular weight of less than about 120, be used. Fluorocarbons are less satisfactory as selective solvents for hydrocarbons of molecular weight about 140–200, as illustrated by n-tetradecane, inasmuch as they are practically immiscible therewith. Observed solubilities (weight per cent at 25° C.) in perfluoromethyldecalin are 0.45 per cent of n-tetradecane and 0.42 per cent of alpha-methyl naphthalene.

An advantage of using a fluorocarbon and a solvent of the character described above, is that the selectivities are additive. The fluorocarbon solvent thus extracts a higher proportion of the non-aromatic hydrocarbons than it would from the mixture alone, because aromatics have been depleted from the mixture by the other solvent. Reciprocally, the other solvent produces a higher concentration of aromatics, because non-aromatics have been depleted by the fluorocarbon solvent. It follows, therefore, that in view of the opposite selectivities of fluorocarbons and other solvents contemplated herein, any substantial miscibilities of the two solvents is intolerable for this invention. Observed solubilities (at 25° C.), to illustrate desirable solvent combinations, are: solubility of perfluoroheptane, $C_7F_{16}$, in triethylene glycol, 1.4 per cent; of perfluoromethyldecalin, $C_{11}F_{20}$, in triethylene glycol, 1.0 per cent; solubility of triethylene glycol in fluorocarbons, less than 0.5 per cent. In general, solubility relationships of a fluorocarbon and a second solvent should be below about 5 per cent, and preferably below about 2 per cent.

In order that this invention may be more readily understood, typical setparation procedures are described below with reference being made to Figures I, II and III attached hereto.

A suitable procedure for treating charge stocks high in aromatic content, for example over 80% by weight, is shown by Figure I. A charge such as a mixture of paraffins and alkyl benzenes boiling in the range of 75 to 115° C., and containing 85% of aromatics, is charged through line 1 to a central section of column 2. A fluorocarbon such as perfluoromethyldecalin is introduced into an upper section of column 2 via line 3 . A second solvent, advantageously triethylene glycol, is fed into a lower section of column 2 through line 4.

The fluorocarbon is withdrawn at the bottom of tower 2 through line 5 together with its non-aromatic (paraffin) extract. The fluorocarbon-paraffin mixture is fractionated in still 6, with the paraffins being removed overhead through line 7; any aromatics in still 6 will be removed overhead with the paraffins. Fluorocarbon is removed from still 6 through line 3 and is recycled to column 2.

Triethylene glycol extracts aromatics from the charge and is removed, together with its aromatic extract, through line 8. This extract is fractionated in still 9; aromatics are taken overhead through line 10 and triethylene glycol is removed from still 9 through line 4 and is recycled. Any paraffins in still 9 are removed overhead with the aromatics.

Generally, of the three layers formed in the column or extractor 2, the fluorocarbon of density 1.7 to 2.0 will form the bottom layer. The second solvent, usually of density 0.8 to 1.2 will form the middle layer, and the hydrocarbon feed of density 0.65 to 0.9 forms the top layer. Of course, if the hydrocarbon feed is highly aromatic (density greater than 1), and the non-fluorocarbon solvent is of low density, the layers will be in a different order.

Provision is made for escape of hydrocarbons from column 2 by including escape line 11 at the top of column 2. Line 11 has pump 12 included therewith such that escaping hydrocarbons can be recycled to column 2 with the hydrocarbon feed.

Provision is made for replacing any solvents lost from the system; make-up fluorocarbon and make-up triethylene glycol are added through lines 13 and 14, respectively.

Conditions of operation in column 2, of necessity, can be varied considerably, depending upon such factors as: concentration of aromatics in charge; concentration of aromatics desired in aromatic extract; completeness of recovery of aromatics desired; particular fluorocarbon used; and particular second solvent used. In general, temperature and pressure of operation are limited only by economic considerations. The ratio of fluorocarbon to hydrocarbon charge is preferably from 1:1 to 20:1, and the ratio of second solvent to hydrocarbon, for example, triethylene glycol, is preferably from 1:1 to 20:1.

Figure II illustrates a procedure similar to that illustrated by Figure I, but in the second procedure (II) acetonitrile is used in place of triethylene glycol. Acetonitrile has a low density, 0.785, with the result that the undissolved hydrocarbon comprises the middle layer. There is no recycle or escaping hydrocarbon, and the aromatic extract is removed from the top of the column or extractor. Acetonitrile (B. P. 82° C.) is not well adapted for extraction of benzene (B. P. 80° C.) because of the difficulty of separating the two compounds by distillation. Specifically, a highly aromatic hydrocarbon feed, for example one containing toluene, in line 21 is led into a central section of extractor 22 wherein it is contracted with a fluorocarbon such as perfluoromethyldecalin, and with acetonitrile. The fluorocarbon is led into extractor 22 at an upper section via line 23, and acetonitrile is fed into a lower section vial line 24.

Fluorocarbon and paraffins extracted from the feed, together with a relatively small quantity of aromatics, are removed from extractor 22 through line 25 and are fractionated in still 26. The hydrocarbons, paraffins and some aromatics, are removed from still 26 via line 27. The fluorocarbon is removed from still 26 via line 23 and is recycled to extractor 22.

Acetonitrile and aromatics extracted therewith, together with a small quantity of paraffins, are taken from extractor 22 through line 28 to still 29. Acetonitrile is taken overhead through line 30 and is recycled to the extractor. Aromatics and any paraffins in still 29 are removed through line 31.

Provision is made for adding make-up fluorocarbon and acetonitrile to the system, by lines 32 and 33, respectively.

In Figure III, a charge such as a mixture of paraffins and alkylbenzenes boiling in the range of 75 to 150° C. is used. A typical charge contains 30 to 40 per cent by weight of aromatics but other concentrations are suitable. Since the solubility of paraffins in fluorocarbons is low, it is uneconomical to provide enough fluorocarbon to dissolve all of the paraffins. Thus the procedure shown by Figure III is efficacious in that most of the concentrating of aromatics is accomplished with the non-fluorocarbon solvent, for example, triethylene glycol, with the fluorocarbon being used to scrub out the last portion of non-aromatics from solution in triethylene glycol. The charge is introduced through line 41 to column or extractor 42. Triethylene glycol (T. E. G.) in line 43 is introduced into an upper section of column 42. It will be understood that the column 42 can comprise conventional countercurrent stage or tower extraction equipment. Contact of the solvent and hydrocarbons can also be aided by conventional packing material in column 42.

The temperature of the mixture and solvent in column 42 should be within the range of about 10 to 150° C. The pressure also should be of the order of 0 to 100 p. s. i. g. The ratio of solvent, triethylene glycol, to hydrocarbon mixture in the extractor 42 is preferably maintained within the range of 1:1 to 20:1, dependent in the main upon the concentration of aromatics in the charge mixture and the desired concentration of the aromatic fractions to be obtained. This feature is explained in more detail hereinafter with reference to a phase diagram, Figure IV-A, for the system benzene-triethylene glycol-n-heptane.

A raffinate is removed from column 42 through line 44 and is introduced into a still 45. Non-aromatics are taken overhead from still 45 through line 46, and can be thus removed from the system. The non-aromatics, as here paraffins, can be further concentrated if desired by further extraction. Triethylene glycol is removed from still 45 through line 47 and is recycled to column 42 via line 43.

The extract from extractor 42 comprises aromatics, triethylene glycol and a relatively small amount of paraffins. This extract is taken through line 48 to column or extractor 49, being introduced into a lower section thereof. A fluorocarbon, such as perfluoromethyldecalin, is introduced into an upper section of column 49 through line 40, and comes into contact therein with the extract from line 48. Here also, it will be understood that column 49 can be modified in the same manner as column 42, described above.

The temperature of the mixture and fluorocarbon in column 49 should be about 10 to 150° C. Similarly the pressure should be about 0 to 50 p. s. i. g. The ratio of fluorocarbon to triethylene glycol extract in the column 49 is preferably maintained within the range of 1:1 to 20:1, dependent upon the concentration of paraffins in the triethylene glycol extract and the desired concentration of the aromatic fractions to be obtained. This is also explained in greater detail hereinbelow in connection with a phase diagram, Figure IV-B, for the system benzene-perfluoromethyldecalin-n-heptane.

The raffinate from column 49 comprises triethylene glycol and aromatics, with a minor quantity, if any, of fluorocarbon. This raffinate is removed from column 49 through line 51 to still 52. In the latter, aromatics are removed overhead through line 53, and are so removed from the system. Triethylene glycol is removed from still 52 through line 54, and is taken to line 43 for recycle in column 42. Any small amount of fluorocarbon in the triethylene glycol in still 52 can be recycled with it to the column 42.

The lower or extract layer in column 49 is removed through line 55 to still 56, wherein removal of fluorocarbon is effected through line 40. Hydrocarbons, predominantly paraffins, in the fluorocarbon extract are removed from still 56 through line 57 and recycled to column 42 as shown.

Make-up fluorocarbon and make-up triethylene glycol to replace any lost solvent, are added to the system through lines 58 and 59, respectively.

The invention is further illustrated by experimental data obtained with fluorocarbons and other solvents recited hereinabove. These experimental data are presented in the form of charts, or more particularly ternary diagrams, identified here as Figures IV-A to VIII. These diagrams can be used to determine: the suitability of a solvent for the desired separation; the selectivity of the solvents; the range of composition of fluorocarbon, other solvent, and the mixture to be treated; the number of stages or extractions necessary to effect a separation of desired degree; etc. The binodal curves were observed by making up synthetic mixtures until they just mixed or just separated. The tie lines showing compositions of layers in equilibrium were analyzed by comparing their densities with those of known synthetic mixtures along the binodal curves.

Figure IV-A represents the system benzene-triethylene glycol-n-heptane, and Figure IV-B represents the system benzene-perfluoromethyldecalin-n-heptane. Figures IV-A and IV-B reveal that triethylene glycol is selective for benzene, but not for n-heptane, and that perfluoromethyldecalin is selective for n-heptane and not for benzene. Thus, the selectivities of the two solvents are opposite, and as such are additive and cooperative. The respective hydrocarbons become more soluble in each solvent because of removal of less soluble material by the other solvent.

Referring further to Figures IV-A and IV-B, it should be noted that the binary solubilities in weight per cent at 25° C. are as follows:

Solubility in triethylene glycol of—
  Benzene _____ 58
  n-Heptane _____ 0.72
Solubility of triethylene glycol—
  Benzene _____ 20
  n-Heptane _____ 0.07
Solubility in perfluoromethyldecalin of—
  Benzene _____ 2.1
  n-Heptane _____ 5.0
Solubility of perfluoromethyldecalin in—
  Benzene _____ 2.7
  n-Heptane _____ 24

The orientations of the tie lines in Figures IV-A and IV-B are consistent with the binary solubilities. That is, the tie lines of Figure IV-A, if prolonged, would intersect the left side line so that the concentration of benzene in the hydrocarbon portion of the extract (left side of the binodal curve) is higher than its concentration in the raffinate. Reciprocally, the tie lines of Figure IV-B would intersect the base line so that the benzene concentration in the raffinate is higher than that in the extract. Observed enrichments or impoverishments) are presented in the following table, Table I:

TABLE I

*Percentage of benzene in extraction*

| Triethylene glycol | | Perfluoromethyldecalin | |
|---|---|---|---|
| Extract | Raffinate | Extract | Raffinate |
| 94.5 | 56.2 | 88.2 | 94.7 |
| 92 | 42 | 56.5 | 60 |
| 87 | 17 | 55.3 | 59.2 |
| 70 | 9 | | |

From the foregoing tabulation, it will be noted that there is more selectivity exhibited by triethylene glycol, than is exhibited (in the reverse direction) by the fluorocarbon. However, it will also be observed that with higher concentrations of aromatics, there is greater selectivity exhibited by the fluorocarbon. This is advantageous because one object is the removal of the last portion of non-aromatic hydrocarbons from mixtures. This is also advantageous since it is most difficult to remove the last portion of non-aromatics by contacting a mixture with a single solvent such as triethylene glycol.

Figure V represents the system benzene-ethylene diformate-n-heptane, and reveals the selectivity of ethylene diformate for benzene. Observed enrichments with ethylene diformate are shown below in Table II:

TABLE II

*Percentage of benzene in extraction*

| Extract | Raffinate |
|---|---|
| 69 | 14 |
| 78 | 24 |
| 83 | 32 |
| 87 | 65 |
| 87 | [1] 87 |

[1] Limit.

This tabulation makes clear that ethylene diformate is excellent for providing highly concentrated aromatic fractions. Considering the same together with the preceding tabulation, it will be evident that ethylene diformate and perfluoromethyldecalin have opposed selectivities and are cooperative when used together.

Figure VI shows the system benzene-acetonitrile-n-heptane. Here again is a showing of a solvent selective for aromatics. Typical data are provided in the following tabulation, Table III:

TABLE III

*Percentage of benzene in extraction*

| Extract | Raffinate |
|---|---|
| 40 | 2 |
| 50 | 5 |
| 57 | [1] 10 |

[1] Limit.

Data has also been obtained with a fluorocarbon comprising perfluorokerosene, corresponding to $C_{11}F_{24}$ and containing 77% fluorine. This fluorocarbon has a density of 1.90. Binary solubilities in weight per cent at 25° C. with this fluorocarbon are:

Solubility in perfluorokerosene of—
 Benzene _____ 2.5
 n-Heptane _____ 4.37
Solubility of perfluorokerosene in—
 Benzene _____ 1.8
 n-Heptane _____ 13.9

An observed enrichment obtained with perfluorokerosene is the following, Table IV:

TABLE IV

Percentage of benzene in extraction

| Extract | Raffinate |
|---------|-----------|
| 88.6    | 92.1      |

All data given above involves separation of paraffins and aromatics. That the present invention is also of value in effecting separation of naphthenes and aromatics is made clear by the following data. Figures VII and VIII show, respectively, the systems: benzene-triethylene glycol-cyclohexane, and benzene-ethylene diformate-cyclohexane. It is clear from these figures (VII and VIII) that triethylene glycol and ethylene diformate are selective for benzene as opposed to cyclohexane. Extractions made with these solvents of benzene-cyclohexane mixtures provide the following data, tabulated in Table V:

TABLE V

Percentage of benzene in extraction

| Triethylene glycol | | Ethylene diformate | | Perfluorokerosene | |
|---|---|---|---|---|---|
| Extract | Raffinate | Extract | Raffinate | Extract | Raffinate |
| 54 | 10 | 52 | 14 | 87.4 | 93.6 |
| 73 | 29 | 66 | 25 | | |
| 79 | 45 | 79 | 68 | | |
| 86 | 57 | 83 | ¹83 | | |
| 90 | 76 | | | | |

¹ Limit.

Solubilities of perfluoromethyldecalin and cyclohexane, and of perfluorokerosene and cyclohexane are as follows:

Solubility in perfluoromethyldecalin of—
 Cyclohexane _____ 4.5
Solubility in perfluorokerosene of—
 Cyclohexane _____ 3.45
Solubility of perfluoromethyldecalin in—
 Cyclohexane _____ 9.1
Solubility of perfluorokerosene in—
 Cyclohexane _____ 4.9

It will be obvious to those skilled in the art that some of the fluorocarbons contemplated herein are less desirable than others for separating a particular non-aromatic hydrocarbon from a mixture. Correspondingly, some of the other solvents contemplated herein for use with said fluorocarbons, are less desirable than others for separating a particular aromatic hydrocarbon from a mixture. For example, a fluorocarbon such as perfluoroheptane ($C_7F_{16}$) has a boiling point of 82.43° C. and perfluorodimethylcyclohexane has a boiling point of 100° C., which boiling points are close to those of benzene, 80.1° C., and of n-heptane, 98.4° C., respectively. Thus, the recovery of such fluorocarbons from benzene and n-heptane in separating said hydrocarbons from a mixture containing the same, is difficult.

A more desirable fluorocarbon solvent for resolving a mixture of benzene and n-heptane, is perfluoromethyldecalin, boiling point 164° C.

We claim:

1. The process of resolving a hydrocarbon mixture containing aromatic and non-aromatic hydrocarbons into fractions of different degrees of aromaticity, which comprises: contacting the mixture with a solvent (A) comprising a fluorocarbon represented by the general formula $$C_xF_y$$

wherein $x$ represents the number of carbon atoms and is an integer from about four to about twenty and $y$ represents the number of fluorine atoms and is an integer from about eight to about forty, and with a second solvent (B) having the following characterizing features:

(1) Incomplete miscibility with the hydrocarbon mixture;

(2) Incomplete miscibility with the fluorocarbon (A);

(3) Forms three phases with the hydrocarbon mixture and the fluorocarbon (A); and (4) Has a preferential affinity for aromatic hydrocarbons;

effecting phase separation of the phases thus formed, a fluorocarbon (A) extract phase, a solvent (B) extract phase, and a hydrocarbon phase.

2. The process of resolving a hydrocarbon mixture containing aromatic and non-aromatic hydrocarbons into fractions of different degrees of aromaticity, which comprises: contacting the mixture with a solvent (A) comprising a fluorocarbon represented by the general formula $$C_xF_y$$

wherein $x$ represents the number of carbon atoms and is an integer from about four to about twenty and $y$ represents the number of fluorine atoms and is an integer from about eight to about forty, and with a second solvent (B) having the following characterizing features:

(1) Incomplete miscibility with the hydrocarbon mixture;

(2) Incomplete miscibility with the fluorocarbon (A);

(3) Forms three phases with the hydrocarbon mixture and the fluorocarbon (A); and (4) Has a preferential affinity for aromatic hydrocarbons;

effecting phase separation of the phases thus formed, a fluorocarbon (A) extract phase, a solvent (B) extract phase, and a hydrocarbon phase removing fluorocarbon (A) from the fluorocarbon (A) extract phase, thereby obtaining a hydrocarbon fraction of less aromaticity than the original hydrocarbon mixture; removing solvent (B) from the solvent (B) extract phase, thereby obtaining a hydrocarbon fraction of greater aromaticity than the original hydrocarbon mixture.

3. The process of claim 1 wherein the fluorocarbon is perfluoromethyldecalin.

4. The process of claim 1 wherein the solvent (B) is selected from the group consisting of: acetic anhydride, acetonitrile, aldol, aniline, anisidines, benzoic anhydride, benzyl alcohol, carbitol, chloroacetic acid, p-chloroaniline, β-chloroethanol, α-chloropropionic acid, chloromaleic anhydride, p-chlorophenol, cinnamic aldehyde, cinnamyl alcohol, 2,4-dinitrochlorobenzene, diethylene glycol, dipropylene glycol, diethylene glycol monomethyl ether, $\beta\beta'$-iminodipropionitrile, $\beta\beta'$oxydipropionitrile, $\beta\beta'$thiodipropionitrile, ethylene diamine, ethylene diformate, ethyl sulfate, ethyl tartrate, furfural, formanilide, furfuryl alcohol, $\beta$-hydroxyethylacetate, $\beta$-hydroxypropionitrile, lactic acid, maleic anhydride, methanol, $\beta$-methoxyethanol, methyl furoate, methyl phthalate, methyl sulfate, monoacetin, o-nitroanisole, nitrobenzene, nitromethane, phenetidines, phenol, phenyl phthalate, phenylethyanolamine, piperonal, liquid sulfur dioxide, tetrahydrofurfuryl alcohol, triethylene glycol and succinonitrile.

5. The process of claim 1 wherein the solvent (B) is triethylene glycol.

6. The process of claim 1 wherein the solvent (B) is acetonitrile.

7. The process of claim 1 wherein the hydrocarbon mixture is one boiling below about 150° C.

8. The process of claim 1 wherein the hydrocarbon mixture is one containing benzene and non-aromatic hydrocarbons boiling between about 70° C. and 90° C.

9. The process of claim 1 wherein the hydrocarbon mixture comprises aromatic and aliphatic hydrocarbons.

10. The process of claim 1 wherein the hydrocarbon mixture comprises aromatic and naphthenic hydrocarbons.

11. The continuous process for separating a hydrocarbon mixture containing aromatic and non-aromatic hydrocarbons into fractions of different degrees of aromaticity which comprises: contacting the mixture with a solvent (A) comprising a fluorocarbon represented by the general formula $$C_xF_y$$

wherein $x$ represents the number of carbon atoms and is an integer from about four to about twenty and $y$ represents the number of fluorine atoms and is an integer from about eight to about forty, and with a second solvent (B) having the following characterizing features:

(1) Incomplete miscibility with the hydrocarbon mixture;
(2) Incomplete miscibility with the fluorocarbon (A);
(3) Forms three phases with the hydrocarbon mixture and fluorocarbon (A);

and (4) Has a preferential affinity for aromatic hydrocarbons;

effecting phase separation of the phases thus formed, a fluorocarbon (A) extract phase, a solvent (B) extract phase, and a hydrocarbon phase; removing fluorocarbon (A) from the fluorocarbon (A) extract phase, thereby obtaining a hydrocarbon fraction of less aromaticity than the original hydrocarbon mixture, and removing from the system said less aromatic hydrocarbon fraction; removing solvent (B) from the solvent (B) extract phase, thereby obtaining a hydrocarbon fraction of greater aromaticity than the original hydrocarbon mixture, and removing from the system said more aromatic hydrocarbon fraction; and recycling to said contacting operation the said fluorocarbon (A) and said solvent (B) removed from their respective extract phases.

12. The process of resolving a hydrocarbon mixture containing aromatic and non-aromatic hydrocarbons into fractions of different degrees of aromaticity, which comprises: contacting the mixture with a solvent (A) selected from the group consisting of:

(a) A fluorocarbon represented by the general formula $$C_xF_y$$

wherein $x$ represents the number of carbon atoms and is an integer from about four to about twenty and $y$ represents the number of fluorine atoms and is an integer from about eight to about forty, (b) A highly fluorinated hydrocarbon having at least about four carbon atoms per molecule and in which at least about eighty per cent of the hydrogen of the parent hydrocarbon has been replaced by fluorine, and (c) A highly fluorinated hydrocarbon having at least about four carbon atoms per molecule and in which at least about eighty per cent of the hydrogen of the parent hydrocarbon has been replaced by fluorine and in which additional hydrogen of the parent hydrocarbon has been replaced by halogen other than fluorine, and with a second solvent (B) having the following characterizing features:

(1) Incomplete miscibility with the hydrocarbon mixture;
(2) Incomplete miscibility with the fluorocarbon (A);
(3) Forms three phases with the hydrocarbon mixture and the fluorocarbon (A);

and (4) Has a preferential affinity for aromatic hydrocarbons;

effecting phase separation of the phases thus formed, a fluorocarbon (A) extract phase, a solvent (B) extract phase, and a hydrocarbon phase.

ALFRED W. FRANCIS.
GEORGE C. JOHNSON.

References Cited in the file of this patent

UNITED STATES PATENTS

| Number | Name | Date |
|---|---|---|
| 1,912,349 | Tuttle | May 30, 1933 |
| 2,295,612 | Soday | Sept. 15, 1942 |
| 2,463,479 | Denton et al. | Mar. 1, 1949 |
| 2,582,197 | Egan | Jan. 8, 1952 |

OTHER REFERENCES

Kalichevsky, "Modern Methods of Refining Lubricating Oils," pages 155–157 (1932). Reinhold Pub. Co.